US008836746B2

(12) United States Patent
Kawamura

(10) Patent No.: US 8,836,746 B2
(45) Date of Patent: Sep. 16, 2014

(54) PIXEL CLOCK GENERATOR, OPTICAL SCANNER AND IMAGE FORMING DEVICE INCORPORATING SAME

(71) Applicant: Shintaro Kawamura, Yokohama (JP)

(72) Inventor: Shintaro Kawamura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/949,635

(22) Filed: Jul. 24, 2013

(65) Prior Publication Data

US 2014/0028776 A1 Jan. 30, 2014

(30) Foreign Application Priority Data

Jul. 27, 2012 (JP) ................................. 2012-167116

(51) Int. Cl.
 *B41J 2/435* (2006.01)
 *B41J 2/385* (2006.01)
 *G02B 26/12* (2006.01)
 *G02B 26/10* (2006.01)
 *G03G 15/043* (2006.01)

(52) U.S. Cl.
 CPC .............. *G02B 26/127* (2013.01); *G02B 26/10* (2013.01); *G03G 15/043* (2013.01)
 USPC ............ 347/249; 347/248; 347/250; 347/129

(58) Field of Classification Search
 USPC .......................................... 347/247–250, 129
 See application file for complete search history.

(56) References Cited

U.S. PATENT DOCUMENTS

| 2003/0025785 A1* | 2/2003 | Nihei et al. ................... 347/250 |
| 2004/0125199 A1 | 7/2004 | Omori et al. |
| 2004/0160506 A1* | 8/2004 | Maeda .......................... 347/129 |

FOREIGN PATENT DOCUMENTS

JP 2005-053095 3/2005

\* cited by examiner

*Primary Examiner* — Sarah Al Hashimi
(74) *Attorney, Agent, or Firm* — Oblon, Spivak, McClelland, Maier & Neustadt, L.L.P.

(57) ABSTRACT

A pixel clock generator device includes a high frequency clock generator, a phase shift data generator to generate phase shift data for controlling a phase shift amount of a pixel clock, a phase shift data pattern generator to read the phase shift data from the phase shift data generator, generate a pattern of the phase shift data for output, and when outputting a same phase shift data pattern for consecutive scan lines, generate, for a next scan line, a phase shift data pattern in which a pixel clock at a position moved by a random number of pixel clocks from a phase-shift position of a pixel clock in a phase shift data pattern for a current scan line is phase-shifted, and a pixel clock generator to generate, on the basis of a high frequency clock, a pixel clock phase-shifted in accordance with the generated phase shift data pattern.

9 Claims, 10 Drawing Sheets

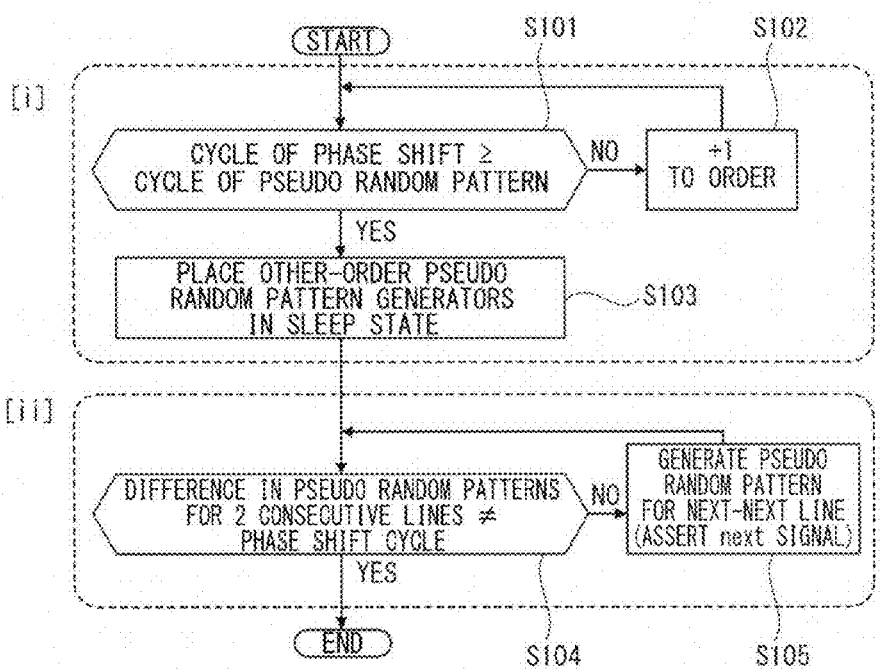

FIG.3

| N | PRIMITIVE POLYNOMIAL | CYCLE |
|---|---|---|
| 1 | $x+1$ | 1 |
| 2 | $x^2+x+1$ | 3 |
| 3 | $x^3+x+1$ | 7 |
| 4 | $x^4+x+1$ | 15 |
| 5 | $x^5+x^2+1$ | 31 |
| 6 | $x^6+x+1$ | 63 |
| 7 | $x^7+x^3+1$ | 127 |
| 8 | $x^8+x^4+x^3+x^2+1$ | 255 |
| 9 | $x^9+x^4+1$ | 511 |
| 10 | $x^{10}+x^3+1$ | 1023 |
| 11 | $x^{11}+x^2+1$ | 2047 |
| 12 | $x^{12}+x^6+x^4+x+1$ | 4095 |
| 13 | $x^{13}+x^4+x^3+x+1$ | 8191 |
| 14 | $x^{14}+x^{10}+x^6+x+1$ | 16383 |
| 15 | $x^{15}+x+1$ | 32767 |
| 16 | $x^{16}+x^{12}+x^3+x+1$ | 65535 |

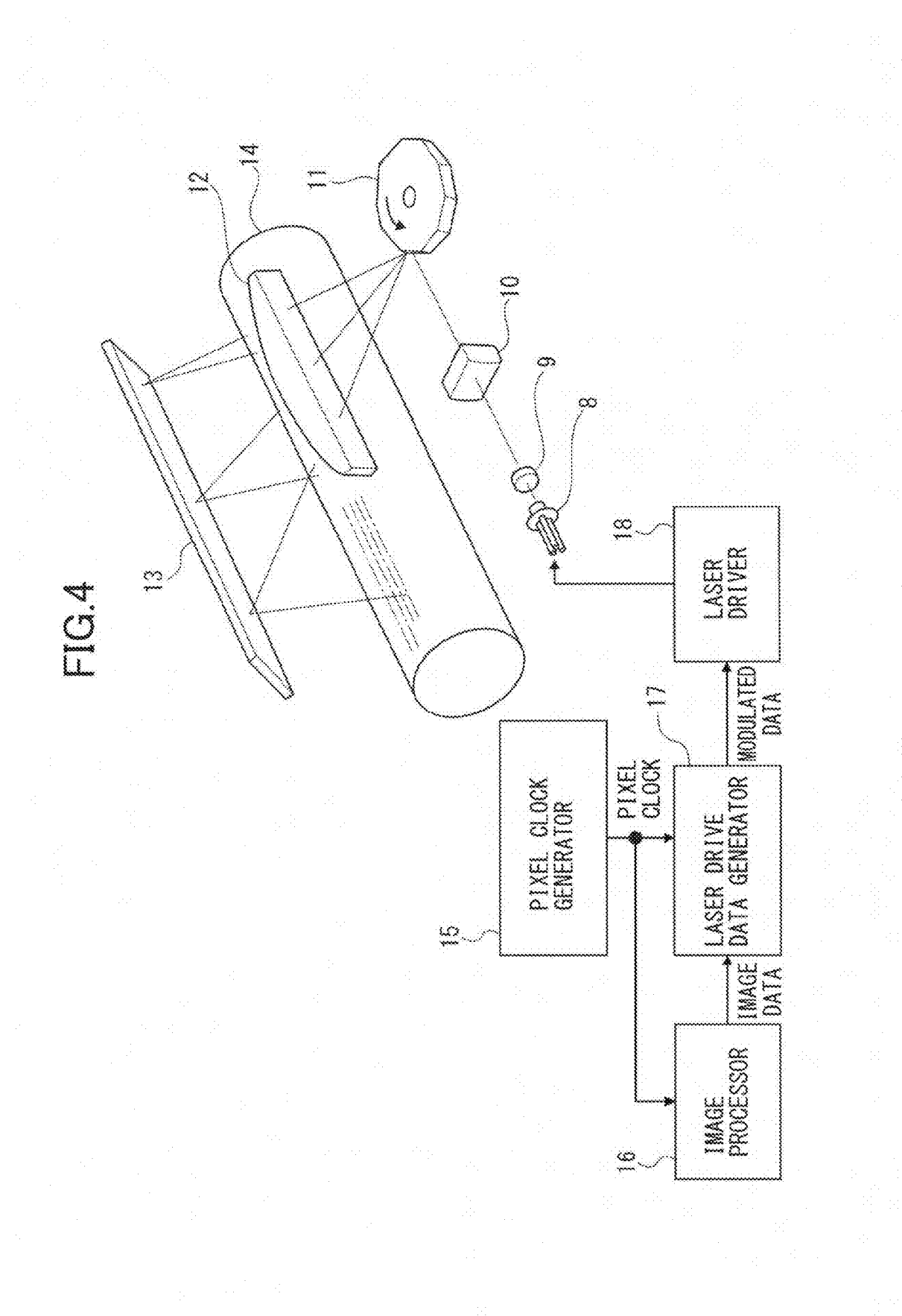

FIG.7A

```
                    REPEATED
                 ⌜‾‾‾‾‾‾‾‾‾⌝
            1.0 1 1 1 0 0 1 0 1 1 1 ··
    1 0 1 1 ) 1 0 0 0.0 0 0 0 0 0 0 0 0 0 0
             1 0 1 1
             ‾‾‾‾‾‾‾
               1 1 0 0
               1 0 1 1
               ‾‾‾‾‾‾‾
                 1 1 1 0
                 1 0 1 1
                 ‾‾‾‾‾‾‾
                   1 0 1 0
                   1 0 1 1
                   ‾‾‾‾‾‾‾
                     1 0 0 0
                     1 0 1 1
                     ‾‾‾‾‾‾‾
                       1 1 0 0
                       1 0 1 1
                       ‾‾‾‾‾‾‾
                         1 1 1 0
                         1 0 1 1
                         ‾‾‾‾‾‾‾
                           1 0 1 0
                           1 0 1 1
                           ‾‾‾‾‾‾‾
                                 1
```

FIG.7B $$x^3 + x + 1 \overline{\smash{\big)}\begin{array}{l} 1 \quad +x^{-2}+x^{-3}+x^{-4} \quad\quad +x^{-7}+ \cdots \\ x^3 \\ \underline{x^3 \quad + x + 1} \\ \quad\quad x + 1 \\ \quad\quad \underline{x \quad + x^{-3}+x^{-2}} \\ \quad\quad\quad 1 + x^{-1}+x^{-2} \\ \quad\quad\quad \underline{1 \quad +x^{-2}+x^{-3}} \\ \quad\quad\quad\quad x^{-1} \quad +x^{-3} \\ \quad\quad\quad\quad \underline{x^{-1} \quad +x^{-3}+x^{-4}} \\ \quad\quad\quad\quad\quad\quad x^{-4} \end{array}}$$

FIG.7C

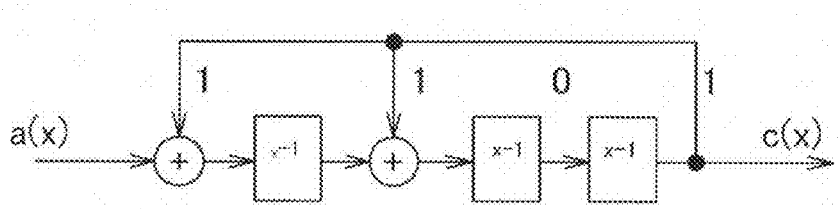

PIXEL CLOCK GENERATOR, OPTICAL SCANNER AND IMAGE FORMING DEVICE INCORPORATING SAME

CROSS REFERENCE TO RELATED APPLICATION

The present application is based on and claims priority from Japanese Patent Application No. 2012-167116, filed on Jul. 27, 2012, the disclosure of which is hereby incorporated by reference in its entirety.

BACKGROUND OF THE INVENTION

1. Field of the Invention

The present invention relates to a pixel clock generator.

2. Description of the Related Art

An image forming device such as laser printer, digital copier is configured to deflect a laser beam from a semiconductor laser unit by a polygon mirror to scan a photoreceptor drum, form optical spots on the photoreceptor drum, and exposure the drum to form an electrostatic latent image thereon. Such a device generates a phase-locked image clock or a pixel clock for each scan line in accordance with a detection signal indicating the detection of a scan beam with a photo detector. It controls the light emission time of the semiconductor laser unit in line with the phase-locked pixel clock and image data for each line, to control the formation of an electrostatic latent image on the photoreceptor drum.

For example, Japanese Patent No. 4313116 discloses a technique to accurately correct shifts in the pixel positions in main scan direction due to environmental changes. It is to acquire, by preliminary experiment or simulation, characteristic values representing shifts in the dot positions of actual image height from the ideal image height of a scan system and prepare a lookup table based on the characteristic values. Phase shift data is read from the lookup table in line with a temporal fluctuation between horizontal synchronous detection signals to correct the main-scan dot shifts with accuracy by controlling the phase of the pixel clock in accordance with the read phase shift data.

SUMMARY OF THE INVENTION

The present invention aims to provide a pixel clock generator device which can prevent the occurrence of vertical or oblique linear noise and improve image quality, as well as an optical scanner and an image forming device incorporating such a pixel clock generator device.

According to one aspect of the present invention, a pixel clock generator device includes a high frequency clock generator, a phase shift data generator to generate phase shift data for controlling a phase shift amount of a pixel clock, a phase shift data pattern generator to read the phase shift data from the phase shift data generator, generate a pattern of the phase shift data for output, and when outputting a same phase shift data pattern for consecutive scan lines, generate, for a next scan line, a phase shift data pattern in which a pixel clock at a position moved by a random number of pixel clocks from a phase-shift position of a pixel clock in a phase shift data pattern for a current scan line is phase-shifted, and a pixel clock generator to generate, on the basis of a high frequency clock, a pixel clock phase-shifted in accordance with the generated phase shift data pattern.

BRIEF DESCRIPTION OF THE DRAWINGS

Features, embodiments, and advantages of the present invention will become apparent from the following detailed description with reference to the accompanying drawings:

FIG. 2A is a flowchart for the operation of a pseudo random pattern generator and FIG. 2B shows an example of phase shift data pattern;

FIG. 3 is a table for the cycle of a pseudo random pattern;

FIG. 4 shows an optical scanner and an image forming device to which the present invention in applied;

FIGS. 7A to 7C show how random patterns are generated; and

DETAILED DESCRIPTION OF PREFERRED EMBODIMENTS

Hereinafter, embodiments of the present invention will be described in detail with reference to the accompanying drawings. Wherever possible, the same reference numbers will be used throughout the drawings to refer to the same or like parts.

Herein, in switching the pattern of phase shift data, the phase shift position of a pixel clock is randomly set for each scan line.

First Embodiment

Figure 5A:
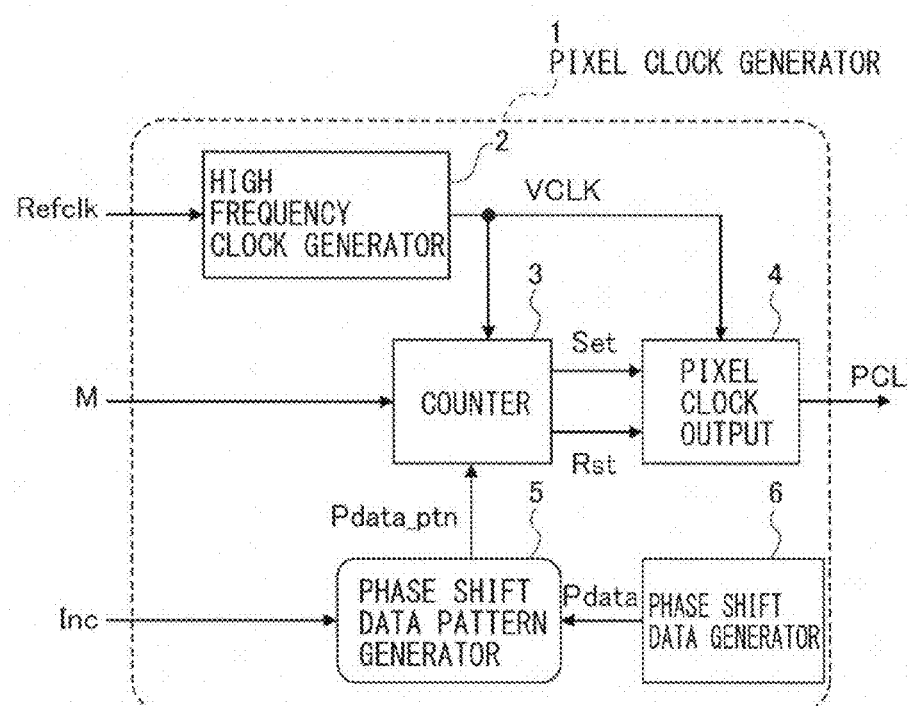
FIG. 5A shows the structure of a related art pixel clock generator and FIG. 5B shows the waveforms of pixel clocks.

FIG. 5A shows the structure of a related art pixel clock generator. Referring to FIG. 5A, the correction of main-scan dot shifts is described. A pixel clock generator 1 comprises a high frequency clock generator 2, a counter 3, a pixel clock output 4, a phase shift data pattern generator 5, and a phase shift data generator 6, to output a pixel clock PCLK.

The phase shift data generator 6 stores characteristic values representing shifts in the dot positions of actual image height from the ideal image height of an optical scan system obtained by preliminary experiment or simulation. The phase shift data pattern generator 5 reads phase shift data from the phase shift data generator 6 in accordance with a variance in the polygon mirror or an environmental change and controls a pixel clock in phase according to the phase shift data to correct the main-scan dot shifts accurately.

In FIG. 5A the high frequency clock generator 2 is a general PLL (phase locked loop) circuit and generates a multiplied high frequency clock VCLK based on a reference clock Refclk. An accurate high frequency clock VCLK is obtainable from a reference clock Refclk output from a precise crystal oscillator.

The counter 3 functions to count the high frequency clock in accordance with a pixel clock frequency signal M (integral), generate a Set signal every time M is counted, count a high frequency clock of M/2 from the Set signal, and generate an Rst signal.

The pixel clock output 4 generates high and low pixel clocks PCLK for output in accordance with the Set signal and Rst signal from the counter 3. The phase shift data generator 6 outputs data Pdata about the correction of scan dot positions. The data Pdata indicates a correction amount relative to the pixel clock frequency signal M, and includes an integral portion Mi, a decimal portion Mf, and a code portion S. For instance, for correction of dot position (positive sign), the high frequency clock is divided by (M+Mi+Mf/Mf') where Mf' represents the accuracy of a decimal portion of a division ratio.

Upon receiving the data Pdata, the phase shift data pattern generator 5 outputs a pattern Pdata_ptn of the phase shift data to the counter 3. For example, when Mf=2048 and Mf'=8192, a M+1 divided pixel clock is inserted into 8,192 pixel clock cycles at 2,048 times. This is called a phase shift. It is M-divided at (8192−Mf) times and a cycle (M+1) is equally allocated. Thus, a phase-shifted pixel clock is inserted once a four times (8192/2048). On the basis of the decimal portion Mf/Mf', the phase shift data pattern generator 5 outputs phase-shift cycle data Pdata_ptn or a phase shift data pattern to the counter 3. Upon receipt of Pdata_ptn, the counter 3 generates the Set signal for shifting the phase of a pixel clock from the Rst signal using a count value M/2+1 or M/2−1. The counter 3 uses the integral portion Mi and code portion S as a selection signal of M+Mi and M/2+1 or M−Mi and M/2−1.

Moreover, the phase shift data pattern generator 5 receives an Inc signal for setting the timing at which a pixel clock to be phase-shifted is inserted. It can change a pixel clock position by changing the value of the Inc signal for each scan line, which will be described in detail later.

Figure 5B:
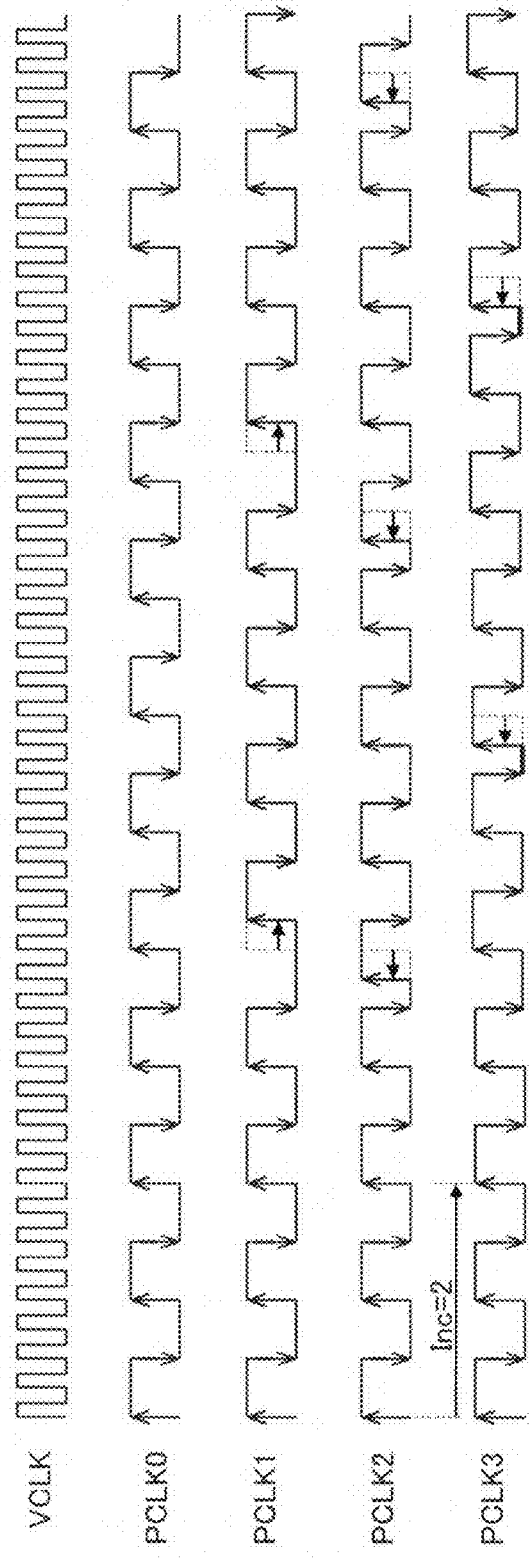

FIG. 5B shows the waveforms of the pixel clock PCLK at M=4. A rising edge and a falling edge appear in a pixel clock PCLK0 with no phase shift for every two high frequency clocks VCLK. The upward arrows are rising edges by the Set signal while the downward arrows are falling edges by the Rst signal. A pixel clock PCLK1 is phase shifted once a four times where Mf=2048, Mf'=−8192. The decimal portion of Pdata is +2,048 and Pdata_ptn contains information on 4 phase-shift cycles and the pixel clock position or Inc signal at which phase shift is started. The cycle of a phase-shifted pixel clock increases by ¼ PCLK0. Further, PCLK2 is a pixel clock when the decimal portion of Pdata is −2,048. In this case the cycle thereof decreases by ¼ PCLK0. Thus, the dot positions in main scan direction are corrected by the phase shift as above.

The Inc signal is set to 0 for PCLK0 to 2 and to 2 for PCLK3. A pixel clock PCLK3 is given an offset at a start position of phase shift data pattern of PCLK2. Using this offset, vertical linear noise can be reduced, which will be described later.

Figure 6A:
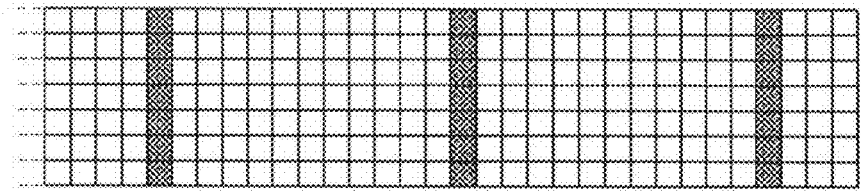
FIGS. 6A to 6C show examples of phase shift data patterns of the pixel clock generator in FIG. 5A.
Figure 6B:
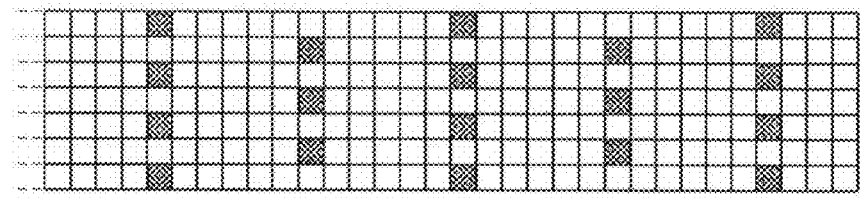
Figure 6C:
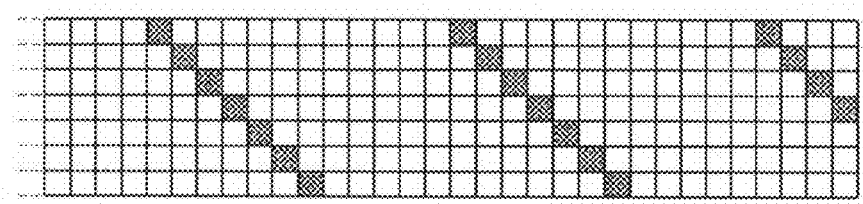

FIGS. 6A to 6C show examples of a simplified phase shift in FIG. 5B. In the drawings transverse direction is main scan direction and longitudinal direction is sub scan direction. Each square indicates dot positions or pixel clock positions stored. Blank squares are normal dots with no phase shift while black squares are phase-shifted dots. The cycle of the phase-shifted dots changes unlike that of the normal dots.

FIGS. 6A to 6C show patterns of phase shift data when a phase shift occurs at once in every 12 pixel clocks. For example, if the same phase shift data pattern is applied for consecutive scan lines as in FIG. 6A, vertical streaks may occur in an image at a position corresponding to the phase-shifted pixel clock positions. Changing the phase shift position for each scan line is effective to reduce such vertical streaks, as disclosed in Japanese Patent No. 4313116.

In FIG. 6B a first phase shift data pattern is applied for a certain scan line while a second phase shift data pattern is applied for a next scan line. The second phase shift data pattern shifts a pixel in phase at an intermediate position in the interval of phase-shifted clocks of the first phase shift data pattern. In comparison with FIG. 6A, vertical streaks are reduced but not completely eliminated. Further, the pixel clocks phase-shifted by the second phase shift data pattern may cause another vertical linear noise on sub scan lines.

In FIG. 6C the phase-shift start position of the pixel clock (4 in FIGS. 6A, 6B) is shifted sequentially by a N-multiple clock (N=1) for each scan line to prevent the vertical linear noise in FIG. 6A from occurring. However, phase-shifted pixel clocks are aligned obliquely, causing another oblique linear noise.

Thus, in related art, linear noise cannot be completely removed and new types of linear noise may occur.

According to the present embodiment, all kinds of linear noise can be reduced by randomly changing a phase shift position of the pixel clock for each scan line.

A pseudo random pattern generation to randomly set a phase shift position of the pixel clock is now described, for example. Pseudo random pattern is a bit string of 0 and 1 widely used in the field of channel coding such as mobile phone. Therein, 0 and 1 appear randomly but the pattern actually has a certain cycle.

The pseudo random pattern is generated by calculation called Modulo2. This calculation is binary addition without carries so that the results of addition and subtraction are the same. It is known that addition and subtraction are realized by exclusive OR, and multiplication and division are realized by bit shift and exclusive OR. By use of a shift register or temporal shift for bit shift, a logic circuit can be simplified in configuration. Specifically, a flip-flop such as D-FF with a clock input can be used. Pseudo random patterns are generated by Modulo2 division.

In a decimal division a quotient can be a recurring decimal. Likewise, Modulo2 division is divisible or not divisible and a non-divisible quotient is a recurring decimal. FIG. 7A shows an example of the Modulo2 division, [1000/1011], and a repetition of a 7-bit pattern "0010111". A remainder of this division will be 0.000001 in every seven digits, and the cycle is 7. That is, in a single cycle three zeros and four ones appear. As the quotient being output, a certain pattern, (0010111) is repeatedly output.

FIG. 7B shows the division of [1000/1011] replaced with $x^3/(x^3+x+1)$. It is seen therefrom that a quotient is also a recurring decimal. FIG. 7C is a block diagram representing the division in FIG. 7B when a delay in one clock is $x^{-1}$ and $a(x)=x^3$.

Figure 8A:
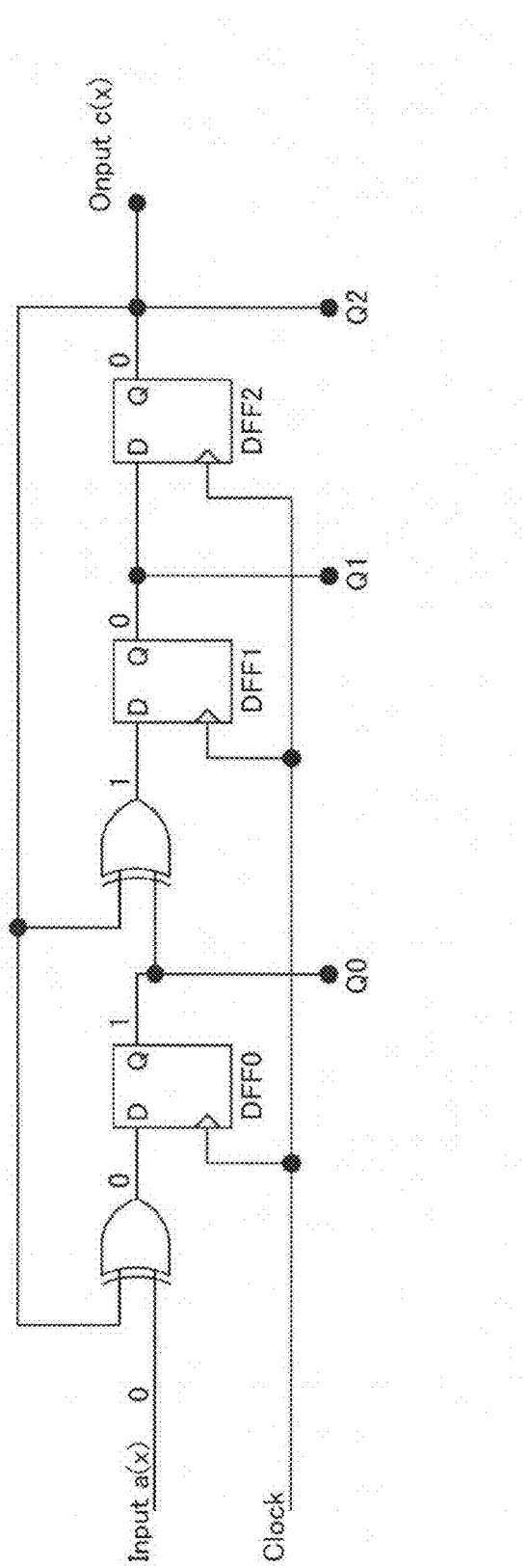
FIG. 8A shows a logic circuit in FIG. 7C
Figure 8B:
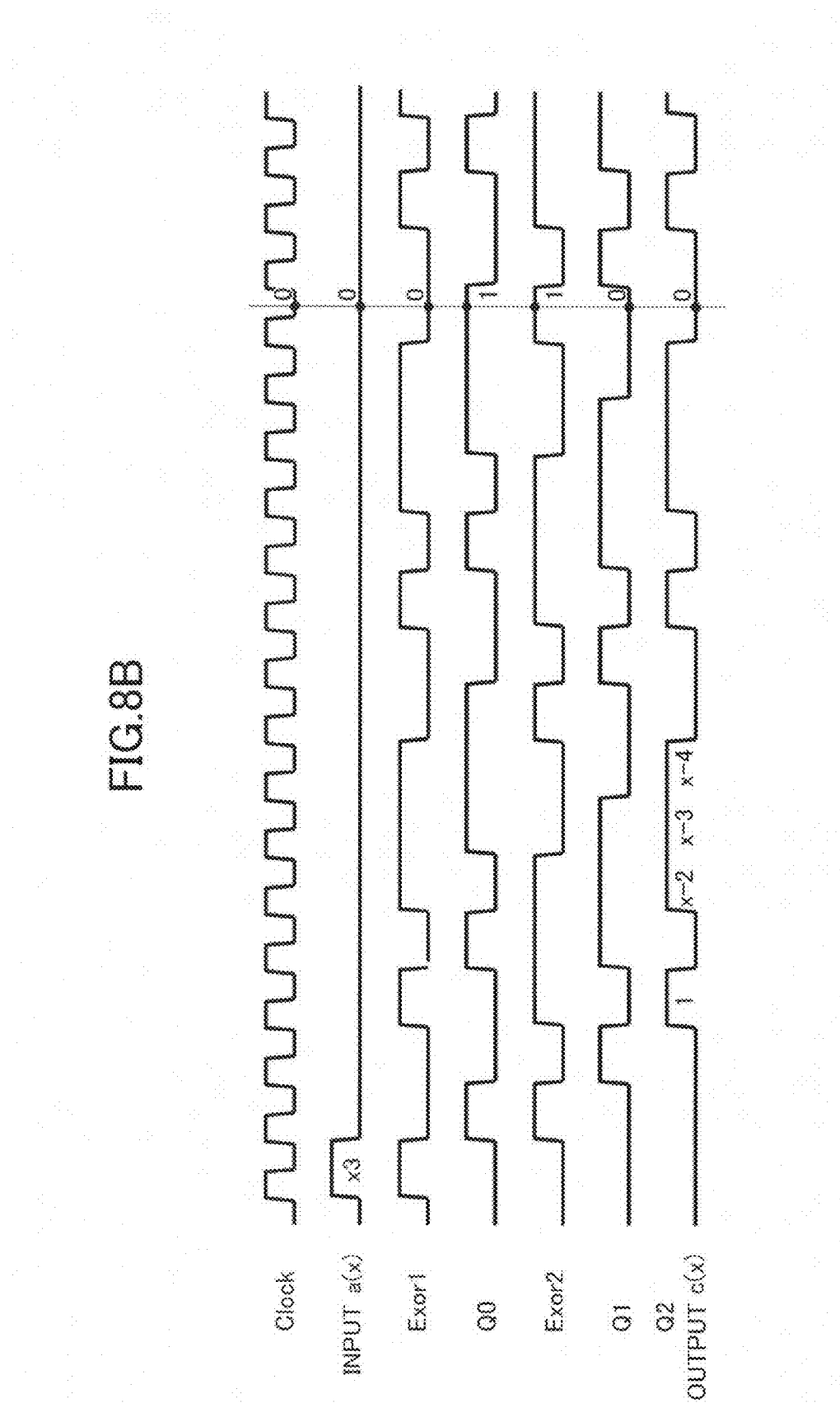
FIG. 8B is a timing chart thereof.

Further, FIG. 8A shows a circuit for the division block in FIG. 7C and FIG. 8B shows a timing chart for the circuit in FIG. 8A. The outputs Q2, Q1, Q0 of three flip-flops DFF0 to DFF2 are (0, 0, 0) while an input a(x) reaches 0 from 1. After the input a(x) returns to 0 from 1, seven patterns of values, (0, 0, 1), (0, 1, 0), (1, 0, 0), (0, 1, 1), (1, 1, 0), (1, 1, 1), and (1, 0, 1) are repeated and the pattern (0, 0, 0) never re-occurs. The number of combinations of (Q2, Q1, Q0) is $2^3=8$ and all the seven patterns except for (0, 0, 0) occur once in one cycle.

As seen from the timing chart in FIG. 8B, the input a(x)=0 while the outputs (Q2, Q1, Q0) are not (0, 0, 0). This means that the input a(x) is substantially unnecessary once the seven patterns start. The 7 cycles of patterns can be generated by one clock only. While the outputs of the three D-FFs are (0, 0, 0), the output c(x) is constantly zero so that random patterns are not generated. Accordingly, it is necessary to avoid all the outputs of the D-FFs from becoming zero by initial setting or a reset signal from outside.

Figure 1A:
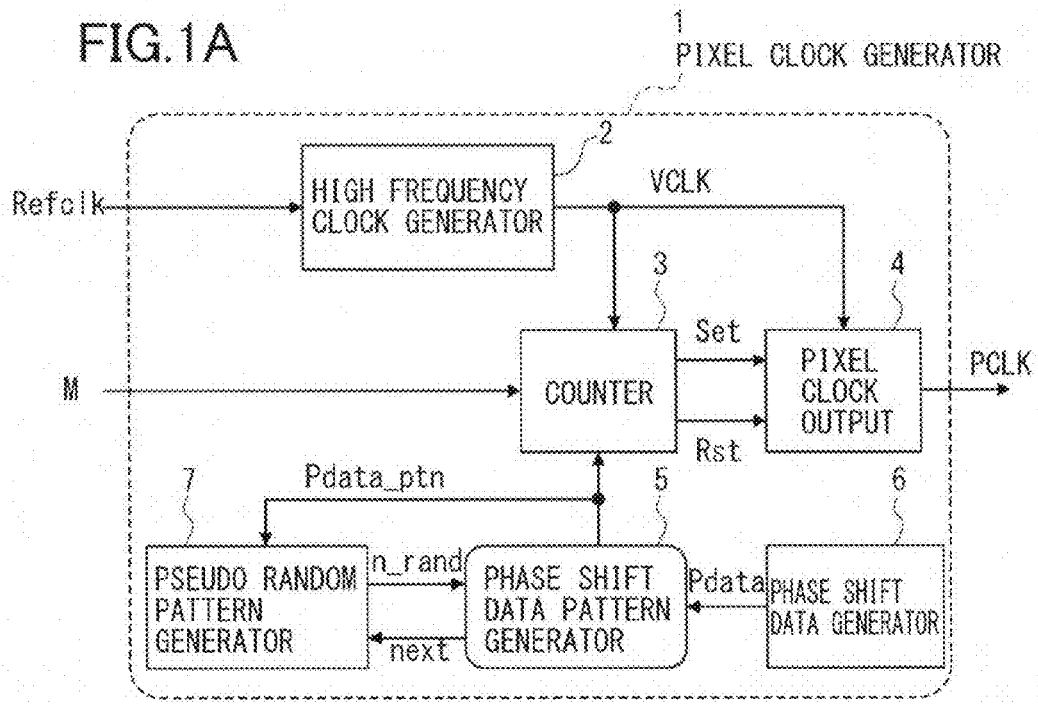
FIG. 1A shows the structure of a pixel clock generator according to one embodiment and FIGS. 1B and 1C show an example of phase shift data pattern.

Next, FIG. 1A shows the structure of a pixel clock generator according to the present embodiment which additionally comprises a pseudo random pattern generator 7 to generate a pseudo random pattern for setting the phase shift position of the pixel clock.

Figure 1B:
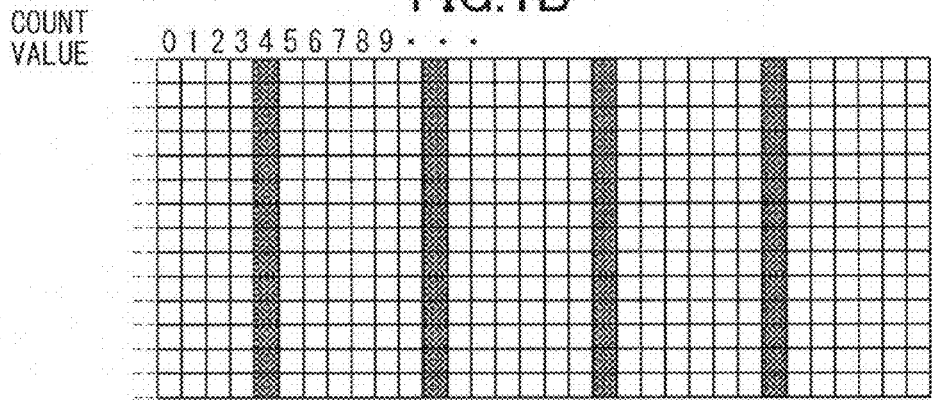

First, the phase shift data pattern generator 5 uses the counter 3 to count a pixel clock in common for each line. It designates the phase shift position of the pixel clock with a count value. In FIG. 1B, for example, the initial count value is 4 and a pixel clock is inserted for phase shift in 7 cycles. The phase-shift position of a pixel clock can be randomly set by designating an increment from the count value as phase shift start position or reference position with the output i.e., pseudo random pattern of the pseudo random pattern generator 7. The block configuration is such that a random pattern n_rand is input to the phase shift data pattern generator 5 from the pseudo random pattern generator 7, as shown in FIG. 1A. The rest of the block function is the same as that in FIG. 5A.

Figure 1C:
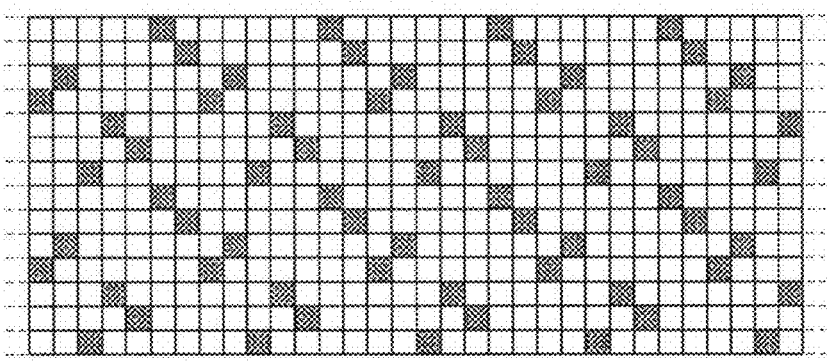

In FIG. 1B the phase shift data pattern of the 7 cycles in which phase shift starts at the same pixel clock position is applied for consecutive scan lines, by way of example. In FIG. 1C using the pseudo random pattern in FIG. 8B, the phase-shift start position of a pixel clock is incremented by 1, 2, 4, 3, 6, 7, and 5 (repeated) in this order relative to a reference count value of 4. In the seven cycles, if the addition of the count value of 4 and the pseudo random pattern is 7 or more, a first phase-shifted pixel clock may appear before the reference count value of 4, as shown in FIG. 1C.

It is seen from FIG. 1C that the positions of phase-shifted pixel clocks do not come at the same position on the consecutive scan lines in sub scan direction. Accordingly, vertical or oblique linear noise will not be conspicuous. Thus, it is possible to prevent the generation of a vertical or oblique linear image in sub scan direction by setting a shift amount of the pixel clock position for each scan line using the pseudo random pattern. Note that pseudo random patterns may be unnecessary if different phase shift data are applied for consecutive scan lines.

As described above, random patterns can be easily generated by the pseudo random pattern generator. Further, the pseudo random pattern generator can be realized by an exclusive OR and a flip-flop alone.

The pseudo random pattern generator 7 comprises a pseudo random pattern generator circuit. FIG. 2A is a flowchart for the operation thereof. The order of the pseudo random pattern generator circuit or order of denominator of division can be a minimal order satisfying the number of cycles to which a pixel clock is inserted for phase shift, as shown in [i] of FIG. 2A. For instance, with the phase-shift cycle being 9, increment values for the phase-shift pixel position should be 1 to 9 (YES in step S101). At the order of 3, increment values 1 to 7 (seven cycles) are not sufficient (NO in step S101). At the order of 4 in step S102, they are 1 to 15 (15 cycles), which can achieve maximal improvement in image quality by random pattern generation. The order more than 4 does not result in improving image quality and may cause unintended vertical linear noise. Excessive increase in the order increases power consumption and chip size unnecessarily.

Further, for selecting the order, a plurality of pseudo random pattern generator circuits with different orders can be prepared. In step S103 a pseudo random pattern generator circuit with a minimal order satisfying a cycle in use is operated while the other-order pseudo random pattern generator circuits are placed in a sleep state, thereby realizing a reduction in power consumption. Further, the pseudo random pattern generator circuits can include a dedicated lookup table containing pseudo random patterns. By referring to the lookup table when needed, the pseudo random pattern generator does not need to be operated constantly, further reducing power consumption.

In FIG. 1C the phase shift cycle is 7 and so is the cycle of the pseudo random pattern so that phase shift does not start at the same pixel clock position on consecutive scan lines. Meanwhile, when the cycle to which a pixel clock is inserted for phase shift is 9 and the cycle of the pseudo random pattern is 15, phase shift starts at the same pixel clock position in the pattern P1 of phase shift data delayed by 3 pixel clocks for a previous scan line and the pattern P2 of phase shift data delayed by 12 pixel clocks for a following scan line, as shown in FIG. 2B. This may cause unintended vertical linear noise.

To avoid the occurrence of unintended vertical linear noise, it is effective not to use the pseudo random patterns for two consecutive scan lines if a difference in them matches an integral multiple of the phase-shift cycle of a pixel clock. In the example in FIG. 2B a difference in the patterns P1 and P2 is 9 so that it matches the phase-shift cycle. In view of this, the phase shift data pattern generator 5 compares pseudo random patterns and phase shift data patterns for two consecutive scan lines, n-line and (n+1) line. With the difference in the pseudo random patterns being an integral multiple of the phase-shift pixel clock cycle (No in step S104), a next signal is asserted and the pseudo random pattern generator 7 applies, to the (n+1) line, a pseudo random pattern for a (n+2) line in step S105. Vertical linear noise can be thus prevented.

As described above, the cycle of a quotient of [1000/1011] or $x^3/(x^3+x+1)$ is 7 but that of [1000/1001] or [1000/1100] is 3 or 1. Generally, when the cycle of a quotient of division is maximal, a polynomial of denominator of division is called primitive polynomial. FIG. 3 shows an example of polynomials. At n=3 or more, plural primitive polynomials exist.

By use of this primitive polynomial for acquiring a pseudo random pattern in a certain cycle, circuit configuration can be minimized, chip size and design costs can be reduced, and power consumption can be reduced.

Second Embodiment

FIG. 4 shows an example of the structure of an electrophotographic image forming device incorporating an optical scanner having the pixel clock generator according to the first embodiment. The optical scanner includes a semiconductor laser 8 as light source, a collimator lens 9, a cylinder lens 10, a polygon mirror 11 as deflector, an fθ lens 12 as optical guide, and a mirror 13. A laser beam emitted from the semiconductor laser 8 is incident on the polygon mirror 11 through the collimator lens 9 and cylinder lens 10 and deflected thereby, and transmits through the fθ lens 12 and is reflected by the mirror 13. The laser beam having transmitted through the fθ lens 12 is incident on a photoreceptor drum 14, forming optical spots or an electrostatic image on the surface of the drum 14.

The image forming device comprises a pixel clock generator 15 according to the first embodiment, an image processor 16, a laser drive data generator 17, and a laser driver 18. The pixel clock generated by the pixel clock generator 15 is input to the image processor 16 and laser drive data generator 17. The image processor generates image data and outputs it to the laser drive data generator 17 in synchronization with the pixel clock. The laser drive data generator 17 outputs, in accordance with the pixel clock, to the laser driver 18, laser drive data as modulated data or PWM data associated with the image data. The laser driver 18 drives the semiconductor laser 8 according to the laser drive data.

Although not shown, the image forming device includes a charger to charge the surface of the photoreceptor drum, a develop element to develop the electrostatic latent image to a toner image, a transfer element to transfer the toner image to an intermediate transfer element, a cleaner to remove remnant toner from the photoreceptor drum 14.

The present invention can be implemented in any convenient form, for example, using dedicated hardware or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A pixel clock generator device, comprising:
   a high frequency clock generator to generate a high frequency clock;
   a phase shift data generator to generate phase shift data for controlling a phase shift amount of a pixel clock;
   a phase shift data pattern generator to read the phase shift data from the phase shift data generator, generate a pattern of the phase shift data for output, and when outputting a same phase shift data pattern for consecutive scan lines, generate, for a next scan line, a phase shift data pattern in which a pixel clock at a position moved by a random number of pixel clocks from a position of a pixel clock phase-shifted in a phase shift data pattern for a current scan line is shifted in phase;
   a pixel clock generator to generate, on the basis of the high frequency clock, a pixel clock phase-shifted in accordance with the generated phase shift data pattern, and
   a pseudo random pattern generator to output a pseudo random pattern as a number of the random number of pixel clocks.

2. The pixel clock generator device according to claim 1, wherein the pseudo random pattern is generated by Modulo-2 division.

3. The pixel clock generator device according to claim 1, wherein the pseudo random pattern generator is configured to apply, for the next scan line, a pseudo random pattern for a scan line after the next scan line when a difference in the pseudo random patterns for the current and next scan lines matches an integral multiple of a phase-shift cycle of a pixel clock.

4. The pixel clock generator device according to claim 1, wherein the pseudo random pattern generator uses a primitive polynomial.

5. The pixel clock generator device according to claim 1, wherein the pseudo random pattern generator includes a dedicated lookup table containing the pseudo random pattern.

6. The pixel clock generator device according to claim 1, wherein a cycle of the pseudo random pattern is selectable.

7. The pixel clock generator device according to claim 6, further comprising
   a plurality of pseudo random pattern generators with different cycles, wherein
   a minimal-order pseudo random pattern generator satisfying a cycle into which a pixel clock is inserted for phase shift is operated while the other-order pseudo random pattern generators are placed in sleep state.

8. An optical scanner, comprising:
   a light source;
   a deflector to deflect a light beam output from the light source;
   an optical guide to guide the light beam deflected by the deflector to a target medium; and
   the pixel clock generator device according to claim 1, wherein
   the light source is driven in synchronization with the pixel clock generated by the pixel clock generator.

9. An image forming device comprising the optical scanner according to claim 8.

* * * * *